United States Patent [19]
Fushiya

[11] Patent Number: 5,201,146
[45] Date of Patent: Apr. 13, 1993

[54] PORTABLE ROTARY TOOL

[75] Inventor: Fusao Fushiya, Anjo, Japan

[73] Assignee: Makita Corporation, Anjo, Japan

[21] Appl. No.: 806,258

[22] Filed: Dec. 13, 1991

[30] Foreign Application Priority Data

Dec. 20, 1990 [JP] Japan ................................. 2-413204

[51] Int. Cl.$^5$ .............................................. B24B 23/00
[52] U.S. Cl. ................................ 51/170 R; 51/170 PT
[58] Field of Search ........... 51/170 R, 170 T, 170 PT, 51/170 TL, 170 MT; 30/514, 383

[56] References Cited

U.S. PATENT DOCUMENTS

| | | | |
|---|---|---|---|
| 4,785,540 | 11/1988 | Arvidsson | 30/514 |
| 5,038,523 | 8/1991 | Farber et al. | 51/170 R |
| 5,065,476 | 11/1991 | Dohse et al. | 30/383 |

FOREIGN PATENT DOCUMENTS 3114906 10/1982 Fed. Rep. of Germany.
4021277 3/1991 Fed. Rep. of Germany.

OTHER PUBLICATIONS

Bosch catalog published in Jul. 1989 (4 pages).

*Primary Examiner*—Roscoe V. Parker
*Attorney, Agent, or Firm*—Dennison, Meserole, Pollack & Scheiner

[57] ABSTRACT

A portable rotary tool includes a body having therein a drive device for rotation of a tool for working. The portable rotary tool further includes a handle which has an operation member mounted thereon for operation of the motor by an operator. A connecting device is provided for connecting the handle with the body and for permitting rotation of the handle relative to the body. The rotational position of the handle relative to the body may be fixed at any desired rotational position by a securing device.

5 Claims, 3 Drawing Sheets

PORTABLE ROTARY TOOL

BACKGROUND OF THE INVENTION

1. Field of the Invention

The present invention relates to a portable rotary tool such as a disc grinder, a sander and a polisher.

2. Description of the Prior Art

A conventional rotary tool such as, for example, a disc grinder includes a body having a motor therein. A grinding wheel for rotation by the motor is mounted under the body at its forward portion. A handle is integrally formed with the rear portion of the body and includes therein a switch for controlling the motor. An operation member is mounted on the bottom of the handle or in the same direction as the grinding wheel. The operation member can be operated for starting the motor through the switch, so that the grinding wheel can be rotated for surface grinding of a work such as a metal material if the grinding wheel is one prepared for surface grinding.

In case that the disc grinder is to be used for cutting or grooving other works such as a concrete, a roof tile or other tiles, a brick and a stone, the grinding wheel is changed to one appropriate for cutting operation. In the practical operation by such grinding wheel appropriate for cutting, the rotary tool is positioned in such a manner that the grinding wheel abuts on the work substantially vertically to its surface. With such positioning of the rotary tool, the handle is turned sideways and therefore, the operation member is directed in a lateral direction (a direction perpendicular to the direction of movement of the grinding wheel for cutting into the work). This may cause difficulties in grasping the handle by an operator and in operating the operation member, so that the handling efficiency as well as the working efficiency may be decreased.

To resolve the above drawbacks, the prior art has proposed to provide a disc grinder having a motor housing and a gear housing which are connected with each other by screws. The motor housing includes a motor therein and is formed with a handle at its one end. The gear housing includes a gear mechanism therein for transmitting rotation of the motor to a grinding wheel. The motor housing and the gear housing can be fixed relative to each other with their positions angularly selectively displaced from each other at intervals of 90° through removal of the screws. An operation member is mounted on the handle for operation of a switch for starting the motor and can be positioned on the side in a direction of movement of the grinding wheel for cutting into the work.

However, with this improved disc grinder, the screws must be completely removed and thereafter fastened again for each displacing operation. Such operation is very troublesome. Further, since the displacement is limited to the intervals of 90°, it does not satisfactorily meet various operation requirements.

SUMMARY OF THE INVENTION

It is, accordingly, an object of the present invention to provide a portable rotary tool in which the rotational position of a handle relative to a body can be selectively determined with a simple construction.

According to the present invention, there is provided a portable rotary tool comprising:

a body having therein a drive device for rotation of a tool for working., a handle having an operation member mounted thereon for operation of the drive means by an operator;

a connecting device for connecting the handle with the body and for permitting rotation of the handle relative to the body; and a securing device for securing the rotational position of the handle relative to the body at any desired rotational position.

The invention will become more fully apparent from the claims and the description as it proceeds in connection with the drawings.

DETAILED DESCRIPTION OF THE PREFERRED EMBODIMENTS

Figure 1:
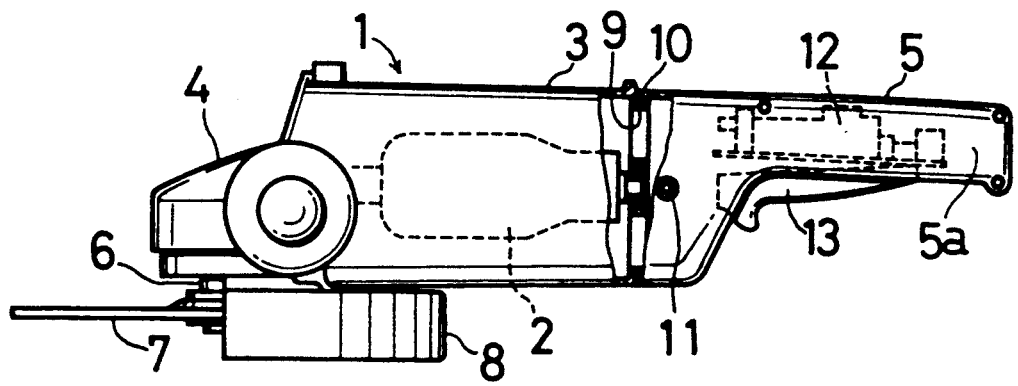
FIG. 1 is a right side view, with a part broken away, of a portable rotary tool according to an embodiment of the present invention.
Figure 2:
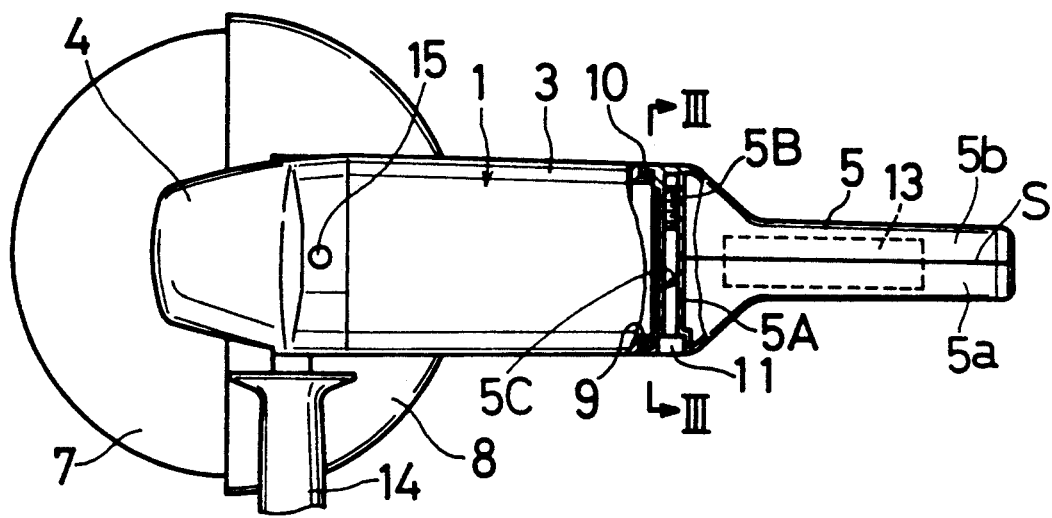
FIG. 2 is a plan view of the portable rotary tool shown in FIG. 1.
Figure 3:
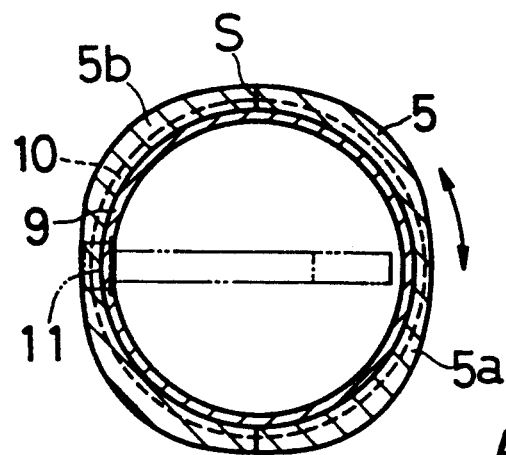
FIG. 3 is a sectional view taken along line III—III in FIG. 2.
Figure 4:
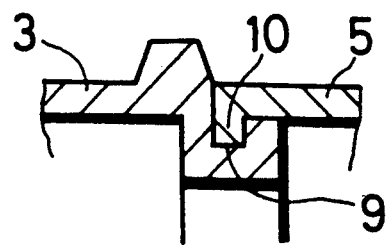
FIG. 4 is an enlarged view of a portion A in FIG. 1.

Referring to FIGS. 1 and 2, there is shown a disc grinder 1 according to an embodiment of the present invention. The disc grinder 1 includes a body 3 having a motor 2 therein, a gear housing 4 integrally formed with the body 3 at the forward end thereof, and a handle 5 mounted on the rear end of the body 3.

A spindle 6 is rotatably supported within the gear housing 4 and is driven by the motor 2 through reduction gears (not shown). The spindle 6 extends downwardly from the gear housing 4 and a disc-like grinding wheel 7 for surface grinding is detachably mounted on the lower end of the spindle 6.

The grinding wheel 7 is covered by a cover plate 8 at its rear half portion. The cover plate 8 is mounted on the bottom of the gear housing 4.

The rear end of the body 3 has a cylindrical configuration and includes an annular recess 9 at its outer surface for mounting the handle 5 thereon as will be hereinafter explained.

The forward end of the handle 5 is expanded and has a cylindrical configuration corresponding to that of the rear end of the body 3. The forward end of the handle 5 includes at its inner surface an annular protrusion 10 which is in engagement with the annular recess 9 of the body 3. Thus, the handle 5 is rotatably connected with the body 3 through engagement of the annular protrusion 10 with the annular recess 9. The handle 5 is separated into two halves 5a and 5b by a separating surface S vertically extending through a rotational axis or the central axis of the handle 5. Ribs 5A and 5B are formed within the halves 5a and 5b of the handle 5, respectively, and are disposed in alignment with each other to form a hole 5C for receiving a screw or a bolt 11. The hole 5C is opened outwardly at its one end on a side of the rib 5A, while it is closed at its the other end on a side of the rib 5B. The one end of the hole 5C is enlarged so as to receive and to engage a head portion of the bolt 11.

The hole 5C is threaded on the side of the rib 5B for engagement with a shank of the bolt 11. Thus, the halves 5a and 5b are fixed together through the bolt 11. Here, when the bolt 11 has been tightened, the annular protrusion 10 of the handle 5 is closely fitted within the annular recess 9, so that the handle 5 can be prevented from rotation relative to the body 3. On the other hand, the handle 5 can be rotated relative to the body 3 when the bolt 11 has been loosened from the tightened position to some extent.

A switch 12 is disposed within the handle 5 for control of the motor 2. An operation member 13 for operation of the switch 12 is mounted on the handle 5 at a position rearwardly of the expanded forward end and partly extends downwardly from the bottom thereof. The operation member 13 is normally positioned on the same side as the spindle 6 for mounting the grinding wheel 7.

Three threaded holes 15 are formed on the upper portion and both lateral portions of the gear housing 4, respectively. An auxiliary handle or a side handle 14 is selectively engageable with either of the threaded holes 15, and is normally engaged with either of the threaded holes 15 formed on the lateral portions of the gear housing 4 in case that the grinding wheel 7 is one prepared for surface grinding.

The motor 2 and the switch 12 is connected through wires (not shown) in such a manner that the handle 5 may not be prevented from rotation by the wires.

The operation of the above embodiment will now be explained.

When the bolt 11 for connection of the halves 5a and 5b of the handle 5 has been loosened to some extent, the contacting force between the halves 5a and 5b as well as the engaging force between the annular recess 9 and the annular protrusion 10 is weakened. At this stage, the handle 5 is free to rotate relative to the body 3, and therefore, the operator can selectively determine the rotational position of the handle 5 or the direction of the operation member 13 of the switch 12. After the position of the handle 5 has been determined, the bolt 11 is tightened to closely connect the half 5a with the half 5b and to closely engage the annular protrusion 10 with the annular recess 9 so as to fix the position of the handle 5.

With the disc grinder 1 of this embodiment, a normal surface grinding operation can be performed with the operation member 13 directed in the same direction as that of the spindle 6 or the direction of a grinding surface of the grinding wheel 7 as shown in FIGS. 1 and 2. With this operation, the side handle 4 is engaged with either of the threaded holes 15 which are positioned at lateral sides of the gear housing 4.

Figure 5:
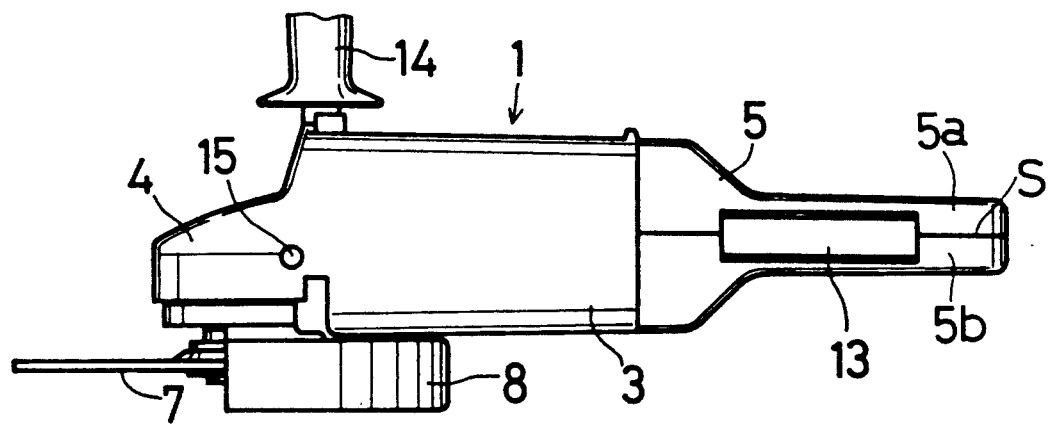
FIGS. 5 and 6 are views showing operation of the portable rotary tool.
Figure 6:
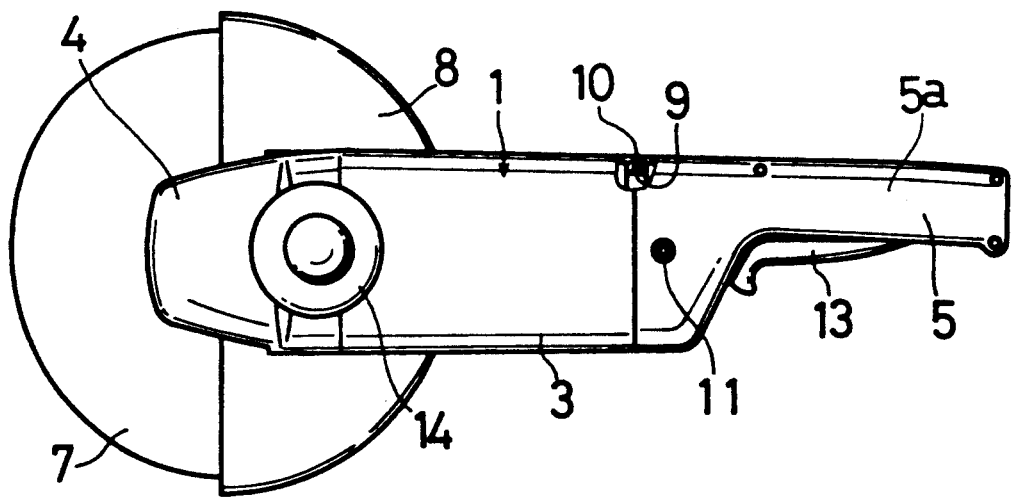

In case of operation for cutting or grooving a work such as a concrete material, a roof tile, a brick and a stone, the grinding wheel 7 is changed to one appropriate for such operation. In such operation, the grinding wheel 7 is positioned perpendicular to the surface of the work. According to such positioning of the grinding wheel 7, the operator rotates the handle 5 relative to the body 3 so as to position the operation member 13 of the switch 12 in the same direction as the direction of movement of the grinding wheel 7 for cutting the work. Thus, the handle 5 is rotated at an angle of 90° from the position shown in FIGS. 1 and 2 to the position shown in FIGS. 5 and 6. The position of the handle 5 is thereafter fixed relative to the body 3 as described above. Further, in this operation, the side handle 14 is engaged with the threaded hole 15 which is positioned at the upper portion of the gear housing 4.

Figure 7:
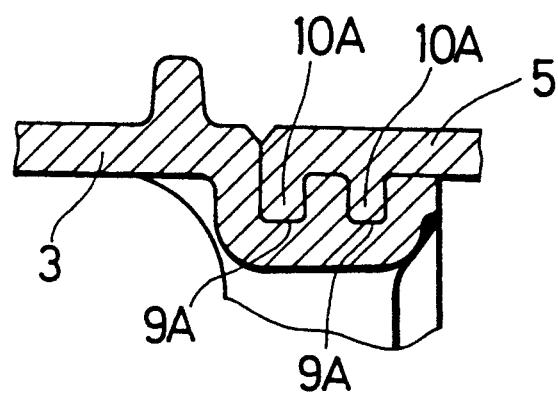
FIG. 7 is a view similar to FIG. 4 but showing a modified construction.

Although, with the above embodiment, only one set of the annular recess 9 and the annular protrusion 10 for engagement therewith is provided for connection between the body 3 and the handle 5, a plural set of an annular recess 9A and an annular protrusion 10A may be provided as shown in FIG. 7 (FIG. 7 shows provision of two sets of the annular recess 9A and the annular protrusion 10A). The annular recesses 9A are formed on the body 3 in parallel with each other and spaced from each other in a direction of the rotational axis of the handle 5. The annular protrusions 10A are formed on the handle 5 in parallel with each other and spaced from each other at the same distance as that between the annular recesses 9A. With such provision of plural sets of the annular recess 9A and the annular protrusion 10A, the strength of the joint portion of the handle 5 with the body 3 can be improved.

Further although the present invention has been described in connection with the disc grinder, the same construction is also applicable to a different portable rotary tool such as a sander and a polisher or to another type of a portable rotary tool driven by air pressure.

Additionally, the position of the handle 5 may be fixed relative to the body 3 through a different securing device such as a clamp device including one utilizing an eccentric cam, and a fastening belt.

While the invention has been described with reference to a preferred embodiment, it is to be understood that modifications or variations may be easily made without departing from the spirit of this invention which is defined by the appended claims.

What is claimed is:

1. A portable rotary tool comprising:
   a body having therein drive means for rotation of a tool for working, said body including an end portion having a cylindrical configuration;
   a handle having an operation member mounted thereon for operation of said drive means by an operator, said handle including an end portion opposed to said end portion of said body and having a cylindrical configuration which is substantially the same as that of said end portion of said body, and said handle including a pair of handle halves separated by a separating surface extending through an axis of rotation of said handle;
   connecting means for connecting said handle with said body and for permitting rotation of said handle relative to said body, said connecting means including at least one annular recess formed on one of said body and said handle and including at least one annular protrusion formed on the other of said body and said handle, and said at least one annular recess and said at least one annular protrusion being opposed to each other in a radial direction for engagement therewith; and
   securing means for securing the rotational position of said handle relative to said body and including fastening means for pressing said handle halves toward each other;
   said handle being prevented from rotation relative to said body through close engagement of said at least one annular protrusion with corresponding said at least one annular recess when said fastening means has been tightened, while said handle being permitted to rotate relative to said body when said fastening means has been loosened.

2. The portable rotary tool as defined in claim 1 wherein said fastening means is a screw mounted on said one end of said handle and extending perpendicular to said separating surface of said handle halves across said handle; and one of said handle halves includes engaging means for engagement with a head of said screw while the other of said handle halves includes a threaded portion for engagement with a shank of said screw, so that the handle can be rotated relative to said body when said screw has been loosened to some extent.

3. The portable rotary tool as defined in claim 1 wherein said body includes a plurality of mounting portions each prepared for detachably mounting an auxiliary handle; and said mounting portions are separated from each other in a direction of rotation of said handle, so that the mounting position of said auxiliary handle can be changed in the direction of rotation of said handle.

4. The portable rotary tool as defined in claim 1 wherein a rotational axis of said handle extends substantially perpendicular to a rotational axis of the tool for working.

5. A portable rotary tool comprising:
- a body having therein drive means for rotation of a tool for working, said body including an end portion having a cylindrical configuration;
- a handle having an operation member mounted thereon for operation of said drive mans by an operator, said handle including an end portion opposed to the end portion of said body and having a cylindrical configuration which is substantially the same as that of said end portion of said body, said handle including a pair of handle halves separated by a separating surface extending through an axis of rotation of the handle;
- connecting means for connecting said handle with said body and for permitting rotation of said handle halves relative to said body, said connecting means including at least one annular recess formed on one of said body and said handle halves and including at least one annular protrusion formed on the other of said body and said handle, said at least one annular recess and said at least one annular protrusion being opposed to each other in a radial direction for engagement therewith; and
- securing means for securing the rotational position of said handle relative to said body and including fastening means for pressing said handle halves toward each other;
- said handle begin prevented from rotation relative to said body at any rotational position through close engagement of said at least one annular protrusion with a corresponding said at least one annular recess when said fastening means has been tightened, while said handle being permitted to rotate relative to said body when said fastening means has been loosened.

* * * * *